(12) United States Patent
Christie, Jr. et al.

(10) Patent No.: US 7,340,749 B2
(45) Date of Patent: Mar. 4, 2008

(54) METHOD AND APPARATUS TO DETECT PRESENCE OF OR A SIZE OF A DATA CARTRIDGE

(75) Inventors: Leslie G. Christie, Jr., Greeley, CO (US); Paul Clinton Coffin, Battle Ground, WA (US); Robert L. Mueller, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 233 days.

(21) Appl. No.: 10/308,524

(22) Filed: Dec. 3, 2002

(65) Prior Publication Data

US 2004/0105352 A1    Jun. 3, 2004

(51) Int. Cl.
*G11B 17/03* (2006.01)

(52) U.S. Cl. ............... 720/606; 369/53.21; 369/53.41

(58) Field of Classification Search ............ 369/30.31, 369/30.27, 30.28, 30.29, 30.32, 33.01, 34.01, 369/77.1, 77.2, 178.01, 197, 53.3, 53.41; 720/615, 699, 606, 631
See application file for complete search history.

(56) References Cited

U.S. PATENT DOCUMENTS

| | | | | |
|---|---|---|---|---|
| 4,807,208 A | * | 2/1989 | Geiger ................... | 369/30.89 |
| 4,846,619 A | | 7/1989 | Crabtree et al. | |
| 5,099,465 A | * | 3/1992 | Geiger et al. ............ | 369/30.34 |
| 5,309,308 A | * | 5/1994 | Nakagawa et al. ........ | 360/137 |
| 5,325,243 A | * | 6/1994 | Rath et al. ................ | 369/77.2 |
| 5,450,254 A | * | 9/1995 | Sato et al. ................ | 360/71 |
| 5,612,831 A | * | 3/1997 | Gallo et al. .............. | 369/30.46 |
| 5,815,468 A | * | 9/1998 | Muramatsu et al. ......... | 369/2 |
| 5,974,014 A | * | 10/1999 | Tajiri ...................... | 369/53.13 |
| 6,021,102 A | * | 2/2000 | Seto et al. ................ | 369/53.23 |
| 6,031,676 A | | 2/2000 | Oenes et al. | |
| 6,104,693 A | * | 8/2000 | Coffin et al. .............. | 369/30.43 |
| 6,130,744 A | * | 10/2000 | Abe et al. ................. | 356/73 |
| 6,160,786 A | * | 12/2000 | Coffin et al. .............. | 369/30.43 |
| 6,213,705 B1 | | 4/2001 | Wilson | |
| 6,219,313 B1 | | 4/2001 | Ries et al. | |
| 6,229,772 B1 | * | 5/2001 | Kumagai et al. ......... | 369/44.27 |
| 6,259,579 B1 | * | 7/2001 | Mueller et al. ............. | 360/92 |
| 6,262,960 B1 | * | 7/2001 | Watanabe ................. | 369/77.2 |
| 6,266,316 B1 | * | 7/2001 | Luffel et al. .............. | 369/30.7 |

(Continued)

FOREIGN PATENT DOCUMENTS

EP    0 833 327    4/1998

(Continued)

OTHER PUBLICATIONS

U.S. Appl. No. 09/814,236, filed Mar. 21, 2001 for "Data Cartridge Detector" of Kelly J. Reasoner, et al. Which patent includes: (21 pages including specification, claims and abstract and Five sheets of formal drawings Figs. 1-5).

*Primary Examiner*—Tan Dinh

(57) ABSTRACT

A media-detection system for a cartridge-receiving device may comprise, according to one embodiment, a cartridge-referencing member mounted to the cartridge-receiving device. The cartridge-referencing member is resiliently displaceable by a data cartridge received in the cartridge-receiving device. A sensor is operatively associated with the cartridge-referencing member. The sensor detecting the data cartridge in the cartridge-receiving device based on the displacement of the cartridge-referencing member.

16 Claims, 5 Drawing Sheets

U.S. PATENT DOCUMENTS

| | | |
|---|---|---|
| 6,297,924 B1 | 10/2001 | Thomas, III et al. |
| 6,298,017 B1 | 10/2001 | Kulakowski et al. |
| 6,301,072 B1 * | 10/2001 | Coffin et al. ................. 360/92 |
| 6,441,984 B1 | 8/2002 | Tsurumaki |
| 6,473,706 B1 * | 10/2002 | Gallo et al. .............. 369/30.31 |
| 6,480,457 B1 * | 11/2002 | Onodera et al. ....... 369/178.01 |
| 6,512,731 B1 * | 1/2003 | Seo et al. ................. 369/77.2 |
| 6,603,725 B2 * | 8/2003 | Sanada et al. .............. 720/616 |
| 6,661,748 B1 * | 12/2003 | Coffin et al. ............ 369/34.01 |
| 6,693,858 B2 * | 2/2004 | Reasoner et al. ........ 369/30.29 |
| 2002/0097657 A1 * | 7/2002 | Seo et al. ................. 369/77.1 |
| 2002/0136100 A1 | 9/2002 | Reasoner et al. |

FOREIGN PATENT DOCUMENTS

| | | | |
|---|---|---|---|
| EP | 1 074 986 | 2/2001 | |
| EP | 1 217 621 | 6/2002 | |
| EP | 0 542 482 | 5/2003 | |
| JP | 2002-042406 | * 2/2002 | ............. 369/30.43 |

* cited by examiner

US 7,340,749 B2

METHOD AND APPARATUS TO DETECT PRESENCE OF OR A SIZE OF A DATA CARTRIDGE

FIELD OF THE INVENTION

The invention generally pertains to media-detection systems, and more specifically, to media-detection systems for cartridge-receiving devices.

BACKGROUND OF THE INVENTION

Media storage systems are well-known in the art and are commonly used to store data cartridges at known locations and to retrieve the desired data cartridges so that data may be written to and/or read from the data cartridges. Such media storage systems are often referred to as autochangers or library storage systems.

A typical autochanger or media storage system may include one or more different types of cartridge-receiving devices. For example, one type of cartridge-receiving device may comprise an individual cartridge storage location (e.g., for holding a single data cartridge) or a storage rack or "magazine" (e.g., for holding a plurality of data cartridges). Another type of cartridge-receiving device may comprise one or more cartridge read/write devices for reading data from and/or writing data to data cartridges. Yet another type of cartridge-receiving device is a cartridge-engaging assembly or "picker". The cartridge-engaging assembly is provided for transporting the data cartridges in the media storage system (e.g., between the storage magazines and the read/write device).

In operation, it is often useful to know whether a data cartridge is present in any of the various cartridge-receiving devices. At start-up, for example, it may be necessary to know whether there is already a data cartridge in the cartridge-engaging assembly which should be returned to a storage magazine before the media storage system will be ready for service.

One way to determine whether a data cartridge is present in a cartridge-receiving device is by monitoring mechanical switches. When a data cartridge passes into or out of the cartridge-receiving device, a switch is thrown (e.g., turned "on" or "off") to indicate the presence or absence of the data cartridge. However, mechanical switches have finite tolerances; a smaller data cartridge may pass into or out of the cartridge-receiving device undetected. This especially occurs if different sizes of data cartridges are to be used in the same media storage system.

It may also be useful to know which size data cartridge is present in the cartridge-receiving device. For example, if a smaller linear tape open (LTO) data cartridge is being retrieved for a read/write operation, it may be necessary to deliver the data cartridge to a read/write device designed for smaller LTO data cartridges. Alternatively, if a larger digital linear tape (DLT) data cartridge is being retrieved for a read/write operation, it may be necessary to deliver the data cartridge to a different read/write device designed for larger DLT data cartridges. Current approaches rely on separation of the different types and sizes of media into physically different media storage systems.

SUMMARY OF THE INVENTION

Media-detection system for a cartridge-receiving device may comprise a cartridge-referencing member mounted to the cartridge-receiving device. The cartridge-referencing member is resiliently displaceable by a data cartridge received in the cartridge-receiving device. A sensor is operatively associated with the cartridge-referencing member, the sensor detecting the data cartridge in the cartridge-receiving device based on the displacement of the cartridge-referencing member.

A method for detecting media in a cartridge-receiving device may comprise receiving the data cartridge within the cartridge-receiving device, and determining a size of the data cartridge received within the cartridge-receiving device.

BRIEF DESCRIPTION OF THE DRAWINGS

Illustrative and presently preferred embodiments of the invention are shown in the drawings, in which.

DETAILED DESCRIPTION

Figure 1:
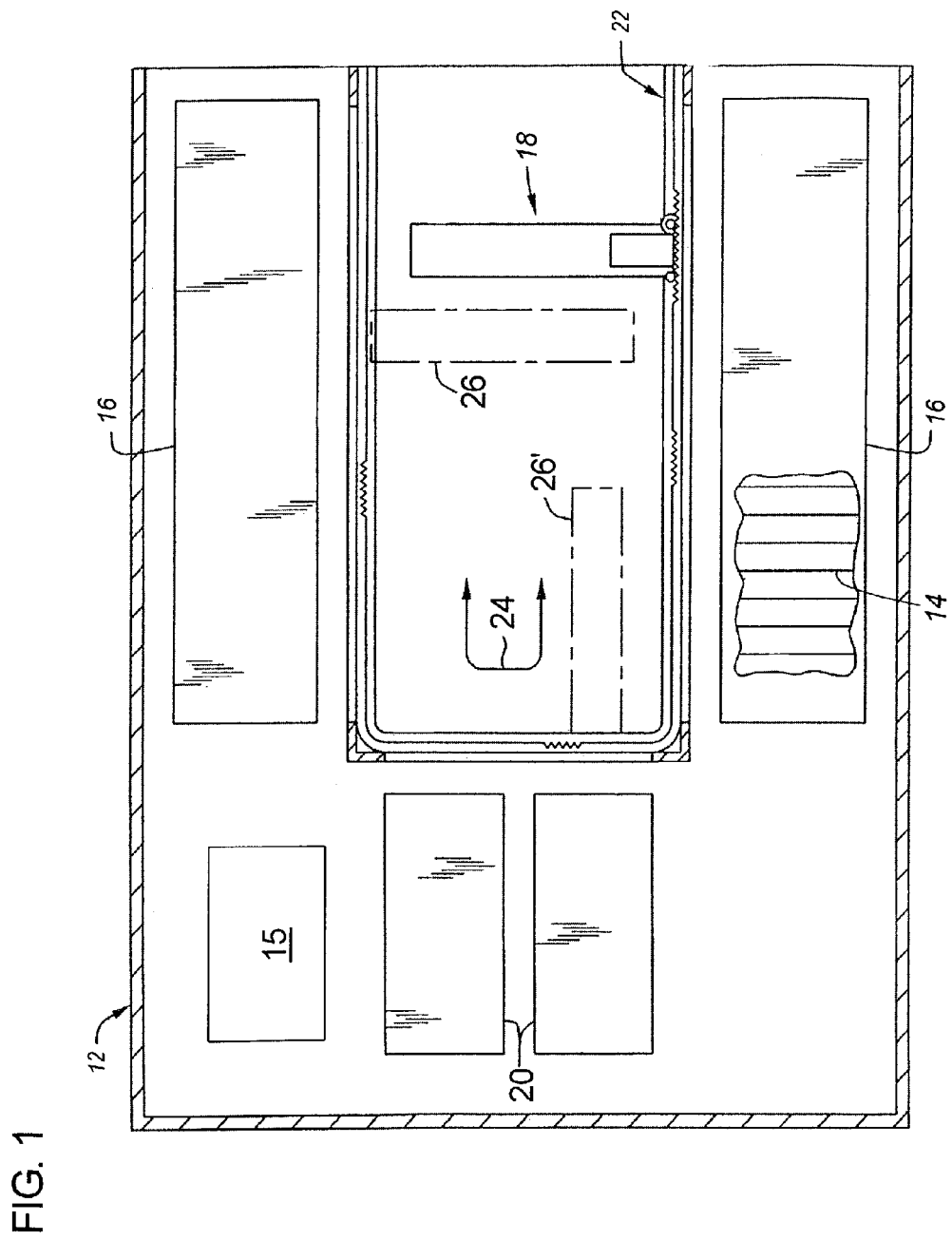
FIG. 1 is a plan view of a media storage system as it may be used according to one embodiment of the invention to store and access data cartridges therein.

An embodiment of a media-detection system 10 (FIG. 4) is shown and described herein as it may be used in media storage system 12 (FIG. 1). Briefly, media storage systems 12 are used to store large volumes of computer-readable data. The computer-readable data is typically stored on multiple data cartridges 14 in the media storage system 12. Storage magazine(s) 16 may be arranged in the media storage system 12, for example, in the generally U-shaped configuration shown in FIG. 1, although other arrangements are also possible. The media storage system 12 may also include a cartridge-engaging assembly 18 that can be operated to retrieve and transport data cartridges 14 between the storage magazines 16 and read/write device(s) 20.

As an illustration of the use of the media storage system 12, a host computer (not shown) may issue a request to access a data cartridge 14 stored in one of the storage magazines 16 to read and/or write data thereto. In response, a controller moves the cartridge-engaging assembly 18 along a positioning rail 22 (i.e., in the directions of arrow 24) until the cartridge-engaging assembly 18 is positioned adjacent the requested data cartridge 14 (e.g., at position 26). Once positioned, the controller signals the cartridge-engaging assembly 18 to withdraw the data cartridge 14 from the storage magazine 16. The controller then moves the cartridge-engaging assembly 18 along the positioning rail 22 until it is adjacent the read/write device 20 (e.g., at position 26'), where the data cartridge 14 is unloaded for a read and/or write operation.

Figure 2:
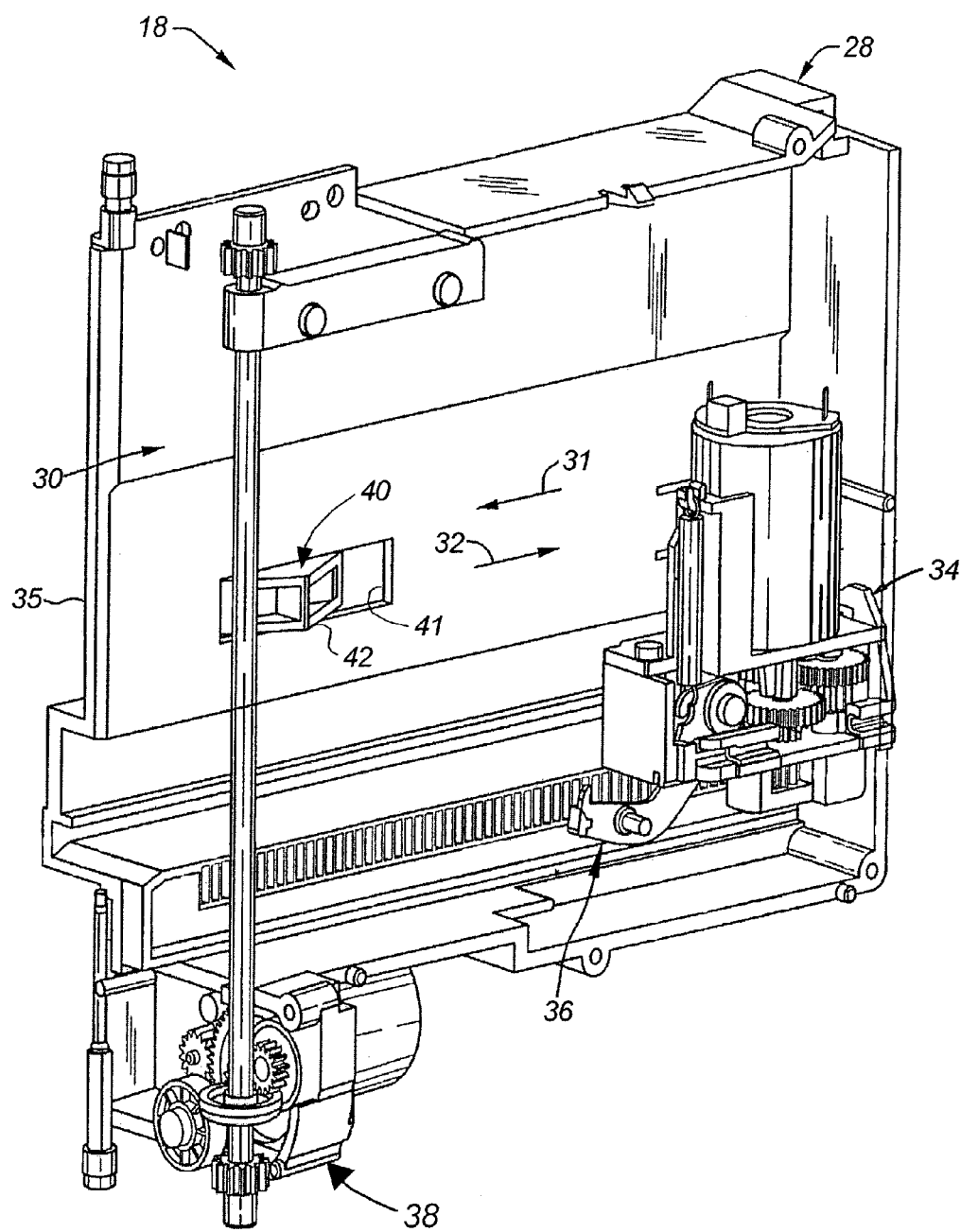
FIG. 2 is a perspective view of one embodiment of a cartridge-engaging assembly for use with the media storage system shown in FIG. 1.

An exemplary cartridge-engaging assembly 18, for use with the media storage system 12, is shown in FIG. 2 with one side removed. The cartridge-engaging assembly 18 may comprise a frame assembly 28 that defines a cavity or chamber 30 therein, which is sized to receive the data cartridge 14 (e.g., for carrying it to the read/write device 20).

A cartridge-plunge mechanism 34 is slidably mounted to the frame assembly 28 so that the cartridge-plunge mechanism 34 may be extended and retracted in the directions illustrated by arrows 31, 32, respectively. Cartridge-plunge mechanism 34 may also be provided with a finger assembly 36 configured to engage data cartridges 14. Movement of the cartridge-engaging assembly 18 may be achieved via actuator system 38 that moves the cartridge-engaging assembly 18 along the U-shaped path defined in the media storage system 12 by the positioning rail 22.

Figure 3:
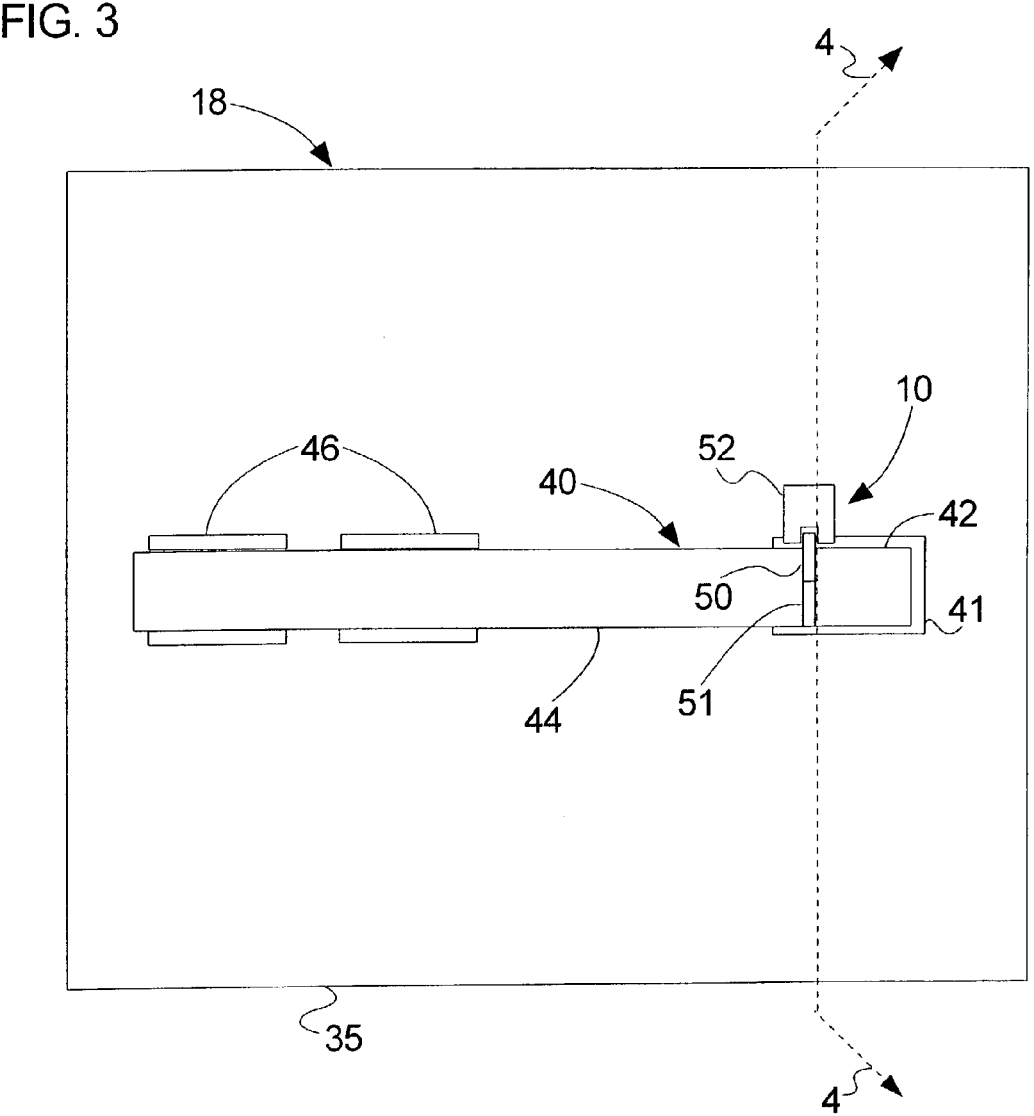
FIG. 3 is a simplified side view of the cartridge-engaging assembly shown in FIG. 2 showing a media-detection system according to one embodiment of the invention.

Also according to one embodiment of the invention, the cartridge-engaging assembly 18 may be provided with a cartridge-referencing member 40, shown in FIG. 2 and FIG. 3. Cartridge-referencing member 40 comprises a head portion 42 mounted or formed on resilient arm 44. The resilient arm 44 may be, for example, a plastic or stainless steel leaf spring attached on one end to sidewall 35 of the cartridge-engaging assembly 18.

The head portion 42 extends through opening 41 formed in sidewall 35 to engage data cartridge 14 when cartridge 14 is inserted into chamber 30 of the cartridge-engaging assembly 18. The resilient arm 44 is flexible, enabling the head portion 42 to move outward from within chamber 30 when data cartridge 14 is inserted therein. Resilient arm 44 also applies a biasing force to the data cartridge 14 to hold it in a registration position in chamber 30 (i.e., against opposite sidewall 35), as illustrated in FIG. 4(b). Accordingly, the cartridge-engaging assembly 18 is adapted to receive different size data cartridges 14.

The cartridge-referencing member 40 may be mounted to the cartridge-engaging assembly 18 in any suitable manner. In one embodiment, at least one tab 46 is provided on sidewall 35, and one end of the cartridge-referencing member 40 is slid therebetween. In other embodiments, the cartridge-referencing member 40 may be mounted using other suitable means such as a rivet, screw, glue, etc.

Of course the cartridge-referencing member 40 is not limited to any particular design. For example, the cartridge-referencing member 40 may be provided with a roller or bearing member mounted to the head portion 42 to engage data cartridge 14 as it is received within the chamber 30. As another example, the cartridge-referencing member 40 may be mounted inside of chamber 30. The particular design of the cartridge-referencing member 40 will depend upon various design considerations, such as, but not limited to, the desired resiliency and durability, space-saving measures, and cost of manufacture.

The foregoing description of the media storage system 12 and cartridge-engaging assembly 18 is provided in order to better understand one environment in which the invention may be used. However, it should be understood that the invention may be used in any of a wide range of other types of media storage systems, and in conjunction with any of a wide range of cartridge-engaging assemblies now known or that may be developed in the future.

In order to determine whether a data cartridge 14 is present in, or absent from the cartridge-engaging assembly 18, and/or to determine the size of data cartridge 14, the cartridge-engaging assembly 18 may be provided with media-detection system 10. For example, the media-detection system 10 may be used to distinguish between narrower LTO data cartridges (approximately 21.5 millimeters (mm) wide) and wider DLT data cartridges (approximately 25.4 mm wide). Accordingly, more than one size data cartridge may be used at the same time in a "mixed" media storage system 12.

Figure 4A:
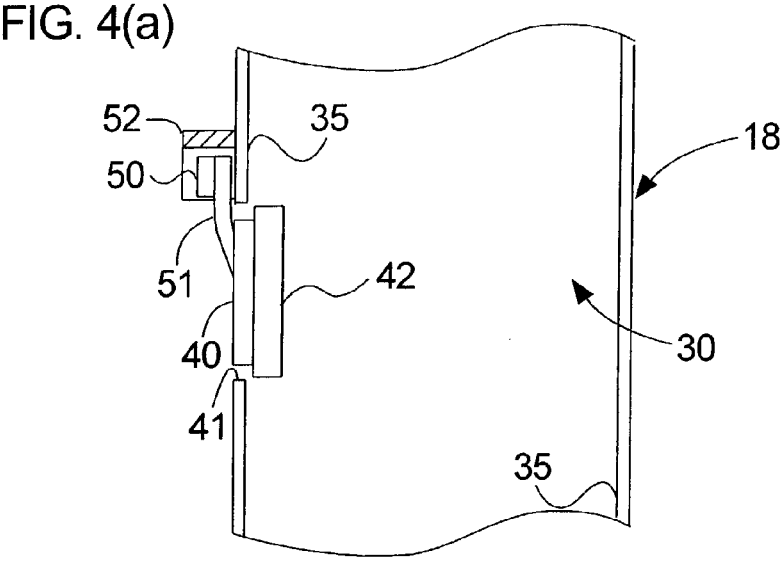
FIGS. 4(a) through 4(c) are simplified front views of the cartridge-engaging assembly taken along line 4-4 of FIG. 3, illustrating operation of the media-detection system according to one embodiment of the invention.
Figure 4B:
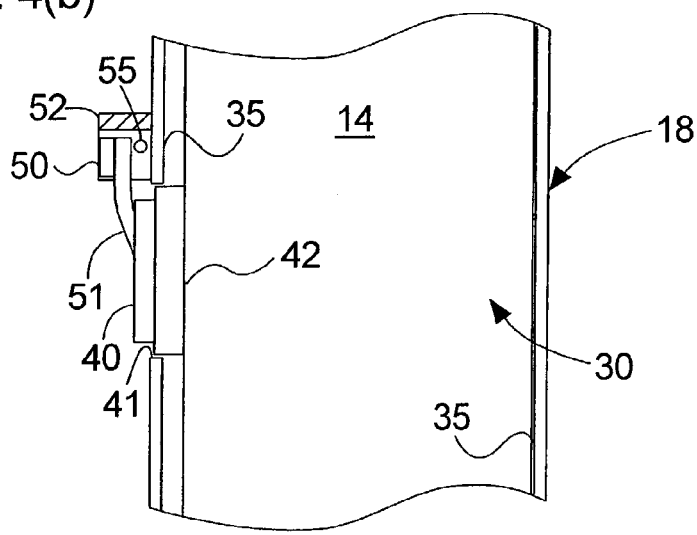

Media-detection system 10 is shown according to one embodiment of the invention in FIG. 3 (see also FIG. 4(a)). Media-detection system 10 may comprise a flag 50 mounted or formed on (e.g., molded over) the cartridge-referencing member 40. For example, support member 51 with the flag 50 may be mounted to the cartridge-referencing member 40. As such, flag 50 extends within the detection range of sensor 52 (see FIG. 4(a)). When data cartridge 14 is received in, or removed from chamber 30 of the cartridge-engaging assembly 18, it causes the cartridge-referencing member 40, and hence the flag 50, to move.

A sensor 52 may be mounted to the sidewall 35 (see FIG. 3 and FIG. 4(a)) of the cartridge-engaging assembly 18. Such sensor is operatively associated with the flag 50 to determine the position of the flag 50. Accordingly, the media-detection system 10 may be used to determine the presence or absence of a data cartridge 14 in chamber 30 of the cartridge-engaging assembly 18 based on the position of the flag 50. In addition, media-detection system 10 may also be used to determine the size of data cartridge 14 received in chamber 30 based on the position of flag 50. Use of the media-detection system 10 is discussed in more detail below.

It is noted that the sensor 52 may be mounted to cartridge-engaging assembly 18 in any suitable manner. Indeed, sensor 52 need not be mounted to one of the sidewalls 35 of cartridge-engaging assembly 18. For example, in another embodiment sensor 52 may be mounted to the top of cartridge-engaging assembly 18 and operatively associated with a flag indicating the height of data cartridge 14.

In addition, any suitable sensor 52 may be used to determine the position of flag 50. Generally, sensor 52 may comprise a signal emitter and a signal detector. The sensor 52 would then determine the position of the flag 50 based on signals it received. It is also noted that any suitable flag 50, may be used with sensor 52 according to the teachings of the invention.

Figure 4C:
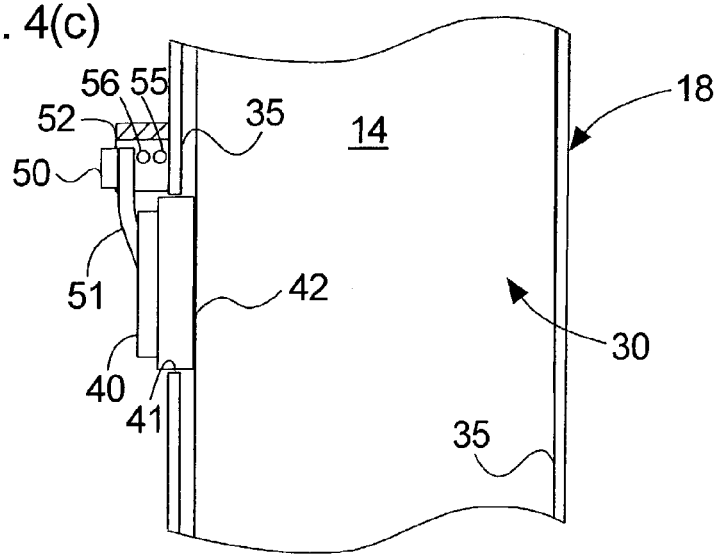

In one embodiment, sensor 52 may comprise at least one light emitting diode (LED) or other suitable light source and at least one photo-detector positioned opposite the light source. The flag 50 may be manufactured from an opaque material and assembled so that it moves between the light source and photo-detector(s), as illustrated in FIG. 4(a) through 4(c). The flag 50 thus blocks all or a portion of the optical path between the light source and the photo-detector. Accordingly, sensor 52 is used to detect the position of flag 50.

In another embodiment, the sensor 52 comprises a mechanical limit switch that can be "thrown" or otherwise activated or alternatively, deactivated, by movement of flag 50. Yet other embodiments are also contemplated as being within the scope of the invention.

Operation of media-detection system 10 according to one embodiment of the invention is illustrated in FIG. 4(a) through FIG. 4(c). In FIG. 4(a), the chamber 30 of the cartridge-engaging assembly 18 is shown empty. The head portion 42 of cartridge-referencing member 40 extends through the opening 41 formed in the sidewall 35. In this position, the flag 50 covers or blocks optical emitters 55 and 56 (FIG. 4(c)) of sensor 52. Thus, a fully-blocked optical path corresponds to the absence of a data cartridge 14 in the cartridge-engaging assembly 30.

When data cartridge 14 is loaded into the cartridge-engaging assembly 18, data cartridge 14 contacts head portion 42 of the cartridge-referencing member 40 and moves it outward, as shown in FIG. 4(b) and FIG. 4(c). For purposes of illustration, an LTO data cartridge 14 is shown received in chamber 30 of the cartridge-engaging assembly 18 in FIG. 4(b), and a DLT data cartridge 14 is shown received in chamber 30 of the cartridge-engaging assembly 18 in FIG. 4(c). The cartridge-referencing member 40 moves to enable different size data cartridges 14 to pass into the chamber 30 and to retain data cartridge 14 in a registration position therein (i.e., adjacent one of the sidewalls 35).

When the cartridge-referencing member 40 moves outward to enable the data cartridge 14 to be received therein, the flag 50 also moves, unblocking a portion of the optical path in sensor 52. For example, in FIG. 4(b) where the narrower LTO data cartridge 14 is received in chamber 30, one of the light sources 55 is unblocked. In FIG. 4(c) where the wider DLT data cartridge 14 is received in chamber 30, two of the light sources 55, 56 are unblocked. Of course this is only an example, and other embodiments are also within the scope of the invention. For example, a single light source may be used, wherein the intensity or amount (e.g., percentage) of light is detected by the sensor 52.

A control system 15 (e.g., comprising computer-readable program code stored on computer-readable media) operatively associated with media-detection system 10 interprets the signal detected by sensor 52. For example, when the optical path is fully blocked, the control system 15 determines that chamber 30 is empty. When the optical path is at least partially unblocked, the control system 15 determines that data cartridge 14 is present in chamber 30.

More specifically in the illustration of FIG. 4(a) through 4 (c), a signal from one of the sources 55 corresponds to a narrower data cartridge 14 (e.g., an LTO data cartridge). A signal from both sources 55, 56 corresponds to a wider data cartridge 14 (e.g., a DLT data cartridge). Accordingly, the control system 15 can determine, track and manage different or mixed media types in the same media storage system 12.

Although the above illustration is discussed in regard to an optical sensor 52, it is understood that other suitable sensors may also be used according to the teachings of the invention. It is also understood that the invention is not limited to three states (i.e., empty-LTO-DLT), as illustrated in FIG. 4(a) through FIG. 4(c). Suitable modifications to the sensor 52 and the control system 15 can readily be made by one skilled in the art after having become familiar with the teachings of the invention.

Figure 5:
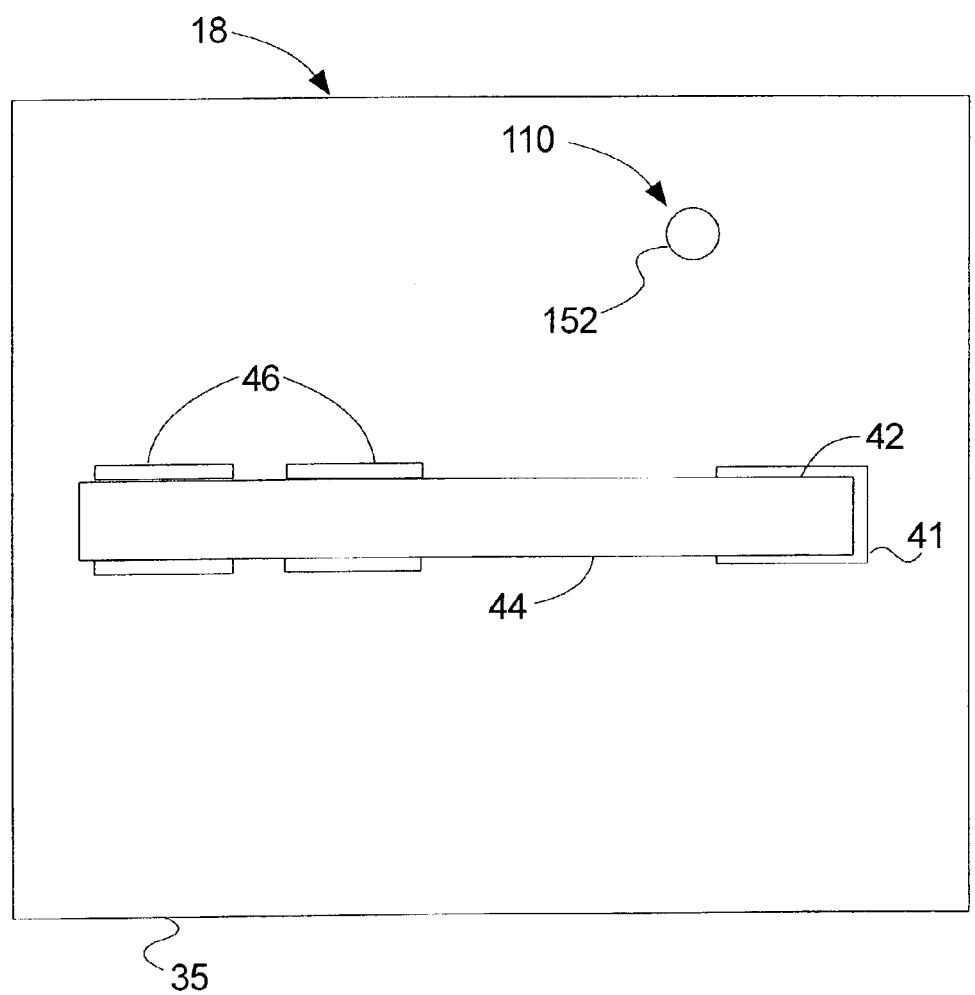
FIG. 5 is a simplified side view of the cartridge-engaging assembly shown in FIG. 2 showing a media-detection system according to another embodiment of the invention.

Another embodiment of a media-detection system 110 is shown in FIG. 5 according to the teachings of the invention. According to this embodiment, a proximity sensor 152 is mounted to sidewall 35 of the cartridge-engaging assembly 18. The proximity sensor 152 is positioned to transmit a signal into chamber 30 toward the opposite sidewall 35, and receive the signal when it is reflected by either data cartridge 14 in chamber 30, or the opposite sidewall 35, as the case may be.

The proximity sensor 152 may comprise an optical or ultrasonic proximity sensor. Proximity sensor 152 emits a signal (e.g., an infrared signal or an ultrasonic signal) into chamber 30. The signal travels through chamber 30 until it comes into contact with data cartridge 14, if such is present, or the opposite sidewall 35, whereupon the signal is reflected back toward the sensor 152. The reflected signal is received by the proximity sensor and the strength of the reflected signal is indicative of the distance from the sensor 152 to the surface from which the signal was reflected.

The distance indicated by the reflected signal may be used to determine the presence (or absence) of the data cartridge 14 in chamber 30. For example, chamber 30 is empty when the distance detected by sensor 152 is equal to the distance across chamber 30 to the opposite sidewall 35. On the other hand, data cartridge 14 is present in chamber 30 when the distance detected by sensor 152 is less than the distance to the opposite sidewall 35.

As an illustration, assume that the distance from the sensor 152 to the opposite sidewall 35 is thirty millimeters. When the distance detected by sensor 152 is thirty millimeters, the chamber 30 is empty. When the distance detected by sensor 152 is less than thirty millimeters, data cartridge 14 is present in chamber 30.

In addition, the distance detected by the sensor 152 may be used to determine the size, and hence the type of data cartridge 14 present in chamber 30. As an illustration, when the distance detected by the sensor 152 is 8.5 mm, a 21.5 mm data cartridge (e.g., an LTO data cartridge) is present in chamber 30 (i.e., 30 mm−8.5 mm=21.5 mm). When the distance detected by the sensor 152 is 4.6 mm, a 25.4 mm data cartridge (e.g., a DLT data cartridge) is present in chamber 30 (i.e., 30 mm−4.6 mm=25.4 mm).

It should be noted that while the invention is shown and described herein as it could be used to store and retrieve LTO and DLT data cartridges 14 having standard sizes and configurations, it is not limited to any particular type or style of data cartridge. Consequently, the present invention should not be regarded as limited to use with LTO and DLT data cartridges.

Furthermore, media-detection system 10, 110 may be used with any cartridge-receiving device, and is not limited to use with cartridge-engaging assembly 18. For example, media-detection system 10, 110 may be used to detect the presence or absence, and/or the size of data cartridge 14 in storage magazine(s) 16 and/or read/write device(s) 20.

What is claimed is:

1. A cartridge-receiving device for use in a media storage system, comprising:
    a frame assembly defining a chamber to receive a data cartridge, wherein the frame assembly is movable in the media storage system between different positions in the media storage system;
    a slidably mounted plunge mechanism slidable to retrieve the data cartridge into the chamber from a storage magazine in the media storage system;
    a cartridge-referencing member mounted inside the chamber, said cartridge-referencing member resiliently displaceable by the data cartridge received in the chamber; and
    a sensor operatively associated with said cartridge-referencing member, said sensor detecting the data cartridge in the chamber based on the displacement of said cartridge-referencing member.

2. The cartridge-receiving device of claim 1, wherein said sensor detects a size of the data cartridge based on the displacement of said cartridge-referencing member.

3. The, cartridge-receiving device of claim 1, wherein said cartridge-referencing member retains said received data cartridge in a registration position within the cartridge-receiving device.

4. The cartridge-receiving device of claim 1, further comprising a flag mounted to said cartridge-referencing member, said flag indicating to said sensor the displacement of said cartridge-referencing member.

5. The cartridge-receiving device of claim 1, further comprising a control system operatively associated with said sensor, said control system determining a site of the data cartridge based on the displacement of said cartridge-referencing member.

6. The cartridge-receiving device of claim 1, wherein said sensor is an optical switch.

7. The cartridge-receiving device of claim 1, wherein said sensor is a mechanical switch.

8. A method comprising:
    moving a cartridge-receiving device between a first position and a second position in a media storage system to position the cartridge-receiving device adjacent a storage magazine;
    receiving a data cartridge from the storage magazine into the cartridge-receiving device;
    displacing a cartridge-referencing member when the data cartridge is received within the cartridge-receiving device, the displacement of the cartridge-referencing member indicating a size of the data cartridge;

sensing, with a sensor, movement of the cartridge-referencing member due to displacement of the cartridge-referencing member by the data cartridge; and automatically determining the size of the data cartridge received within the cartridge receiving device based on output of the sensor.

9. A method for detecting mixed media in a cartridge-receiving device, comprising:

receiving a data cartridge within the cartridge-receiving device provided in a media storage system having a cartridge-engaging assembly for retrieving the data cartridge from a storage magazine and moving the data cartridge to a read/write device, the cartridge-receiving device being one of the cartridge-engaging assembly, storage magazine, and read/write device;

displacing a flag when the data cartridge is received within the cartridge-receiving device, the displacement of the flag indicating a size of the data cartridge;

sensing, with a sensor, movement of the flag due to displacement of the flag when the data cartridge is received within the cartridge-receiving device; and automatically determining the size of the data cartridge received within the cartridge receiving device based on output of the sensor.

10. The method of claim 8, further comprising retaining the data cartridge in a registration position within the cartridge-receiving device before determining the size of the data cartridge.

11. A media storage system comprising:

a storage magazine containing at least one data cartridge;

a read/write device; and a cartridge-engaging assembly separate from the storage magazine, the cartridge-engaging assembly to retrieve the data cartridge from the storage magazine into a chamber of the cartridge-engaging assembly, the cartridge-engaging assembly moveable in the media storage system from a position adjacent the storage magazine to another position adjacent the read/write device to load the data cartridge into the read/write device, the cartridge-engaging assembly comprising:

a media-detection mechanism having a sensor to detect a size of the data cartridge received in the chamber of the cartridge-engaging assembly, the media-detection mechanism further comprises a cartridge-referencing member mounted to the cartridge-engaging assembly, the cartridge-referencing member resiliently displaceable by the data cartridge received in the chamber, wherein the sensor is operatively associated with the cartridge-referencing member and the sensor detects the size of the data cartridge based on the displacement of the cartridge-referencing member.

12. The cartridge receiving device media storage system of claim 11, further comprising an actuator mechanism to move the cartridge-engaging assembly in the media storage system.

13. The media storage system of claim 11, wherein the sensor detects a first size of the data cartridge based on a first displacement of the cartridge-referencing member, and the sensor detects a second size of the data cartridge based on a second displacement of the cartridge-referencing member.

14. The media storage system of claim 11, wherein the media-detection mechanism is adapted to emit light into the chamber, and the sensor detects light reflected train a surface of the data cartridge, the reflected light indicative of the size of the data cartridge.

15. The cartridge-receiving device of claim 1, wherein the plunge mechanism is inside the chamber.

16. The cartridge-receiving device of claim 1, wherein the frame assembly is separate from the storage magazine in the media storage system.

* * * * *

UNITED STATES PATENT AND TRADEMARK OFFICE
CERTIFICATE OF CORRECTION

PATENT NO. : 7,340,749 B2
APPLICATION NO. : 10/308524
DATED : March 4, 2008
INVENTOR(S) : Leslie G. Christie, Jr. et al.

It is certified that error appears in the above-identified patent and that said Letters Patent is hereby corrected as shown below:

In column 6, line 39, in Claim 3, after "The" delete ",".

In column 6, line 49, in Claim 5, delete "site" and insert -- size --, therefor.

In column 8, line 16, in Claim 12, after "The" delete "cartridge receiving device".

In column 8, line 27, in Claim 14, delete "train" and insert -- from --, therefor.

Signed and Sealed this

Twenty-second Day of July, 2008

JON W. DUDAS
*Director of the United States Patent and Trademark Office*